US006567521B1

(12) United States Patent
Hein

(10) Patent No.: US 6,567,521 B1
(45) Date of Patent: May 20, 2003

(54) SUBSCRIBER LOOP INTERFACE CIRCUITRY HAVING BIFURCATED COMMON MODE CONTROL

(75) Inventor: Jerrell P. Hein, Driftwood, TX (US)

(73) Assignee: Silicon Laboratories, Inc., Austin, TX (US)

( * ) Notice: Subject to any disclaimer, the term of this patent is extended or adjusted under 35 U.S.C. 154(b) by 0 days.

(21) Appl. No.: 09/375,911

(22) Filed: Aug. 17, 1999

(51) Int. Cl.[7] .............................. H04M 1/00; H04M 9/00
(52) U.S. Cl. .............. 379/399.01; 379/377; 379/413.02
(58) Field of Search .................. 379/399.01, 413.02, 379/324, 377, 382, 413.01

(56) References Cited

U.S. PATENT DOCUMENTS 4,590,583 A * 5/1986 Miller ......................... 364/724

(List continued on next page.)

FOREIGN PATENT DOCUMENTS

GB          2290921 A   * 10/1996   .......... H04M/19/02

OTHER PUBLICATIONS

Advanced Micro Devices, "Am7920: Subscriber Line Interface Circuit Preliminary Datasheet," Publication #19239, Rev. E, Jul. 1998.
Advanced Micro Devices, "Am79213/Am79C203/031: Advanced Subscriber Line Interface Circuit (ASLIC™) Device/Advanced Subscriber Line Audio–Processing Circuit (ASLAC™) Device Preliminary Datasheet," Publication #19770, Rev. B, Sep. 1998.

(List continued on next page.)

Primary Examiner—Binh Tieu
(74) Attorney, Agent, or Firm—Davis & Associates; William D. Davis

(57) ABSTRACT

A subscriber loop interface circuit having bifurcated common mode control loops includes a DC common mode control for controlling tip and ring DC common mode characteristics, and an AC common mode control for controlling tip and ring AC common mode characteristics, wherein the AC and DC common mode controls are independent. In one embodiment, the DC common mode control includes a tip current source for generating a tip current, $i_{dt}$, and a ring current source for generating a ring current, $i_{dr}$, Each of $i_{dt}$ and $i_{dr}$ is proportional to a difference between a DC tip voltage (TIPDC) and a control voltage ($V_{cmcontrol}$). Thus, in one embodiment, $i_{dt}=g_{dt}(\text{TIPDC}-V_{cmcontrol})$, and $i_{dr}=g_{dr}(\text{TIPDC}-V_{cmcontrol})$. In one embodiment, the AC common mode control includes a tip current source for generating a tip current, $i_{at}$, and a ring current source for generating a ring current, $i_{ar}$. Each of $i_{at}$ and $i_{ar}$ is a function of an AC tip voltage (TIPAC) and an AC ring voltage (RINGAC). The currents $i_{at}$ and $i_{ar}$ are proportional to a difference between a first gain term times an AC longitudinal voltage and a second gain term times the AC tip voltage. Thus in one embodiment, the AC tip current source provides the current $$i_{at} = g_{at1}\left(\frac{TIPAC + RINGAC}{2}\right) - g_{at2} \cdot TIPAC.$$

Similarly, the AC ring current source provides the current $$i_{ar} = g_{ar1}\left(\frac{TIPAC + RINGAC}{2}\right) - g_{ar2} \cdot TIPAC.$$

The second gain term in each AC current control equation enables cancellation of unwanted contributions from the DC control loop in the audio band.

18 Claims, 2 Drawing Sheets

U.S. PATENT DOCUMENTS

| | | | | |
|---|---|---|---|---|
| 4,598,173 A | * | 7/1986 | Chea, Jr. et al. | 379/399 |
| 4,803,721 A | * | 2/1989 | Schingh | 379/399 |
| 4,827,505 A | | 5/1989 | Takato et al. | |
| 5,175,764 A | * | 12/1992 | Patel et al. | 379/412 |
| 5,347,577 A | | 9/1994 | Takato et al. | |
| 5,392,334 A | | 2/1995 | O'Mahony | |
| 5,636,273 A | | 6/1997 | Schopfer et al. | |
| 5,828,748 A | | 10/1998 | Akhteruzzaman | |
| 5,848,149 A | | 12/1998 | Chen et al. | |
| 5,956,386 A | * | 9/1999 | Miller | 379/27 |
| 6,292,033 B1 | * | 9/2001 | Enriquez | 327/89 |
| 6,400,187 B1 | * | 6/2002 | Enriquez | 327/89 |

OTHER PUBLICATIONS

Advanced Micro Devices, "Am79231: Intelligent Subscriber Line Interface Circuit (ISLIC™) Advance Information Datasheet," Publication #22419, Rev. A, Sep. 1998.

Advanced Micro Devices, "Am79Q2241/2242/2243: Quad Intelligent Subscriber Line Audio–Processing Circuit (ISLAC™) Advance Information Datasheet," Publication #22421, Rev. A, Sep. 1998.

Advanced Micro Devices, "Am79R241: Intelligent Subscriber Line Interface Circuit (ISLIC™) Advance Information Datasheet," Publication #22420, Rev. A, Sep. 1998.

Advanced Micro Devices, "Am79R79: Ringing SLIC Device Technical Overview Application Note," Publication #19768, Rev. B, May 1997.

Lucent Technologies, "L8576 Dual Ringing SLIC Preliminary Datasheet," Mar. 1998.

SGS–Thomson Microelectronics, "L3000N/L3030 Subscriber Line Interface Kit Preliminary Data," Jan. 1995.

SGS–Thomson Microelectronics, "L3000S/L3030 Subscriber Line Interface Kit Preliminary Data," Jun. 1997.

SGS–Thomson Microelectronics, "L3037 Subscriber Line Interface Circuit," Dec. 1997.

SGS–Thomson Microelectronics, "SGS–Thomson SLIC AC Models Application Note," 1995.

Goodenough, F., "SLIC Ejects Relays From PABX Line Cards", Electronic Design, vol. 42, No. 14, Jul. 11, 1994, pp. 55–56, 58–59, 62–64, Penton Publishing, Cleveland, OH.

* cited by examiner

SUBSCRIBER LOOP INTERFACE CIRCUITRY HAVING BIFURCATED COMMON MODE CONTROL

FIELD OF THE INVENTION

This invention relates to the field of communications. In particular, this invention is drawn to subscriber loop interface circuitry.

BACKGROUND OF THE INVENTION

A subscriber loop interface circuit typically provides a communications interface between the plain old telephone system (POTS) network and subscriber equipment such as a telephone. The subscriber equipment is coupled to the POTS network of a central office exchange by an analog subscriber line. The analog subscriber line and subscriber equipment form a subscriber loop. The pair of wires presented to the subscriber equipment by the subscriber line are individually referred to as "tip" and "ring."

The interface specifications of a subscriber loop interface circuit typically require relatively high voltages and currents for control signaling with respect to the subscriber equipment on the subscriber loop. Voiceband communications are typically low voltage analog signals on the subscriber loop. Subscriber loop performance requirements such as common mode voltage specifications are divided into DC requirements (<300 Hz) and AC requirements (300 Hz–3.4 kHz) for tip and ring.

In one implementation, compliance with AC and DC common mode performance requirements is achieved with a single common mode control loop. One disadvantage of using a single common mode control loop is that longitudinal gains of the tip and ring control must be tightly matched at DC when they are not otherwise required to be. Another disadvantage is that components referencing the longitudinal signal $$\frac{TIP + RING}{2}$$

must have a large dynamic range to operate over both DC and AC ranges. Another disadvantage is that the same longitudinal current drive must provide both AC and DC corrections. The use of a single common mode control loop necessarily implies the use of the same feedback signal for both AC and DC common mode control. Although the use of the longitudinal signal $$\frac{TIP + RING}{2}$$

as feedback for AC common mode control may be desirable, the DC common mode requirements are typically specified with respect to the tip voltage. Given that the tip voltage cannot be determined from the longitudinal signal, the DC common mode characteristics cannot be adequately controlled to specification.

SUMMARY OF THE INVENTION

In view of limitations of known systems and methods, a bifurcated common mode control for a subscriber loop interface circuit is provided. A subscriber loop interface circuit having bifurcated common mode control loops includes a DC common mode control for controlling tip and ring DC common mode characteristics, and an AC common mode control for controlling tip and ring AC common mode characteristics, wherein the AC and DC common mode controls are independent.

In one embodiment, the DC common mode control includes a tip current source for generating a tip current, $i_{dt}$, and a ring current source for generating a ring current, $i_{dr}$. Each of $i_{dt}$ and $i_{dr}$ is proportional to a difference between a DC tip voltage and a control voltage.

In one embodiment, the AC common mode control includes a tip current source for generating a tip current, $i_{at}$, and a ring current source for generating a ring current, $i_{ar}$. Each of $i_{at}$ and $i_{ar}$ is a function of the AC tip and ring voltages. The currents generated by each AC common mode current source are controlled by a difference between a first gain term times an AC longitudinal voltage and a second gain term times the AC tip voltage. The second gain term enables cancellation of unwanted contributions from the DC control loop in the audio band.

In one embodiment, a subscriber loop interface circuit apparatus includes a first tip current source for generating a DC tip current component, $i_{dt}$, proportional to a difference between a first tip voltage (TIPDC) and a control voltage ($V_{cmcontrol}$) such that $i_{dt}=g_{dt}(\text{TIPDC}-V_{cmcontrol})$. A second tip current source provides an AC tip current component $$i_{at} = g_{at1}\left(\frac{TIPAC + RINGAC}{2}\right) - g_{at2} \cdot TIPAC,$$

wherein TIPAC and RINGAC correspond to AC tip and ring voltages, respectively. In one embodiment, the subscriber loop interface circuitry includes a first ring current source to generate a DC ring current component $i_{dr}=g_{dr}(\text{TIPDC}-V_{cmcontrol})$ and a second ring current source to generate an AC ring current component $$i_{ar} = g_{ar1}\left(\frac{TIPAC + RINGAC}{2}\right) - g_{ar2} \cdot TIPAC.$$

In various embodiment, the gain terms $g_{ar1}$ and $g_{at1}$ are matched such that $g_{at1} \approx g_{ar1}$. Typically, the DC voltages (TIPDC) correspond to tip voltages having frequencies less than 300 Hz. The AC voltages (TIPAC and RINGAC) correspond to tip and ring voltages of frequencies greater than 300 Hz, respectively.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Specifications such as Functional Criteria for Digital Loop Carrier Systems (Bellcore TR-NWT-000057, January 1993) and Interface Between Carriers and Customer Installations (ANSI T1.401-1993) set forth subscriber loop common mode voltage requirements in terms of AC (300 Hz–3.4 KHz) and DC (<300 Hz) performance.

For the DC case, the requirements are as follows:
a) TIP and RING must be less than 0 volts, with RING more negative than TIP;
b) for ground start applications, TIP should follow a specified current/voltage (I/V) curve that implies an open circuit voltage for TIP between 0 and −5 volts.

In addition, TIP should be kept near 0 Volts in order to minimize power dissipation.

For the AC case, the requirements are as follows:
a) maximum rejection of incoming common mode signals (>50 dB rejection at 1 kHz); and
b) minimum generation of common mode signals while transmitting (typically −45 to −50 dB metallic-to-longitudinal conversion)

The DC specifications typically entail controlling the TIP voltage within loose tolerances (±1 V). In contrast, the AC specifications require processing the signal $$\left(\frac{TIP+RING}{2}\right)$$

with great accuracy in order to achieve balances on the order of 50 dB.

Figure 1:
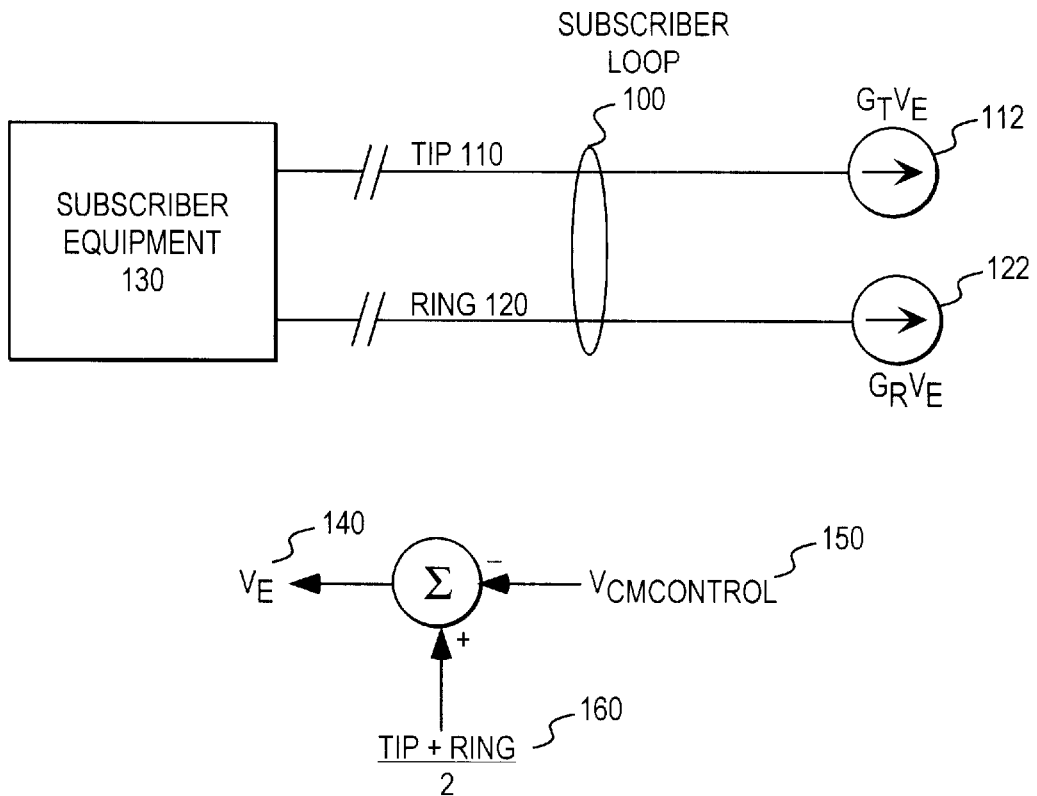
FIG. 1 illustrates the use of a same common mode control for controlling AC and DC common mode voltages in a subscriber loop.

FIG. 1 illustrates a subscriber loop 100 terminating with subscriber equipment 130. The conductors forming the loop are referred to as tip 110 and ring 120. Typically a single common mode control is used to control the tip 110 and ring 120 voltages for both AC and DC specifications. Tip current source 112 and ring current source 122 provide appropriate currents for achieving these specifications.

The common mode voltage is controlled using control voltage $V_{cmcontrol}$ 150. An error voltage, $V_E$ 140, corresponding to the difference between the control voltage and the longitudinal signal $$\left(\frac{TIP+RING}{2}\right)$$

is provided as input to the current sources 112 and 122. Current sources 112 and 122 provide tip and ring currents proportional to $V_E$ 140.

The use of the same common mode control for DC and AC common mode loops tends to impose requirements in addition to those required by specification. For example, the longitudinal gains $G_T$ and $G_R$ must be tightly matched even at DC although though no such requirement is otherwise specified. The signal $$\left(\frac{TIP+RING}{2}\right)$$

must have a large dynamic range to operate over both DC (tens of volts) and AC (mV) ranges. In addition, the same longitudinal current drive must be used to deliver DC and AC corrections. Some of these unnecessary requirements can be eliminated by bifurcating the common mode current control such that DC common mode control depends only on the DC tip voltages and AC common mode current control depends predominately on the AC longitudinal voltages.

Figure 2:
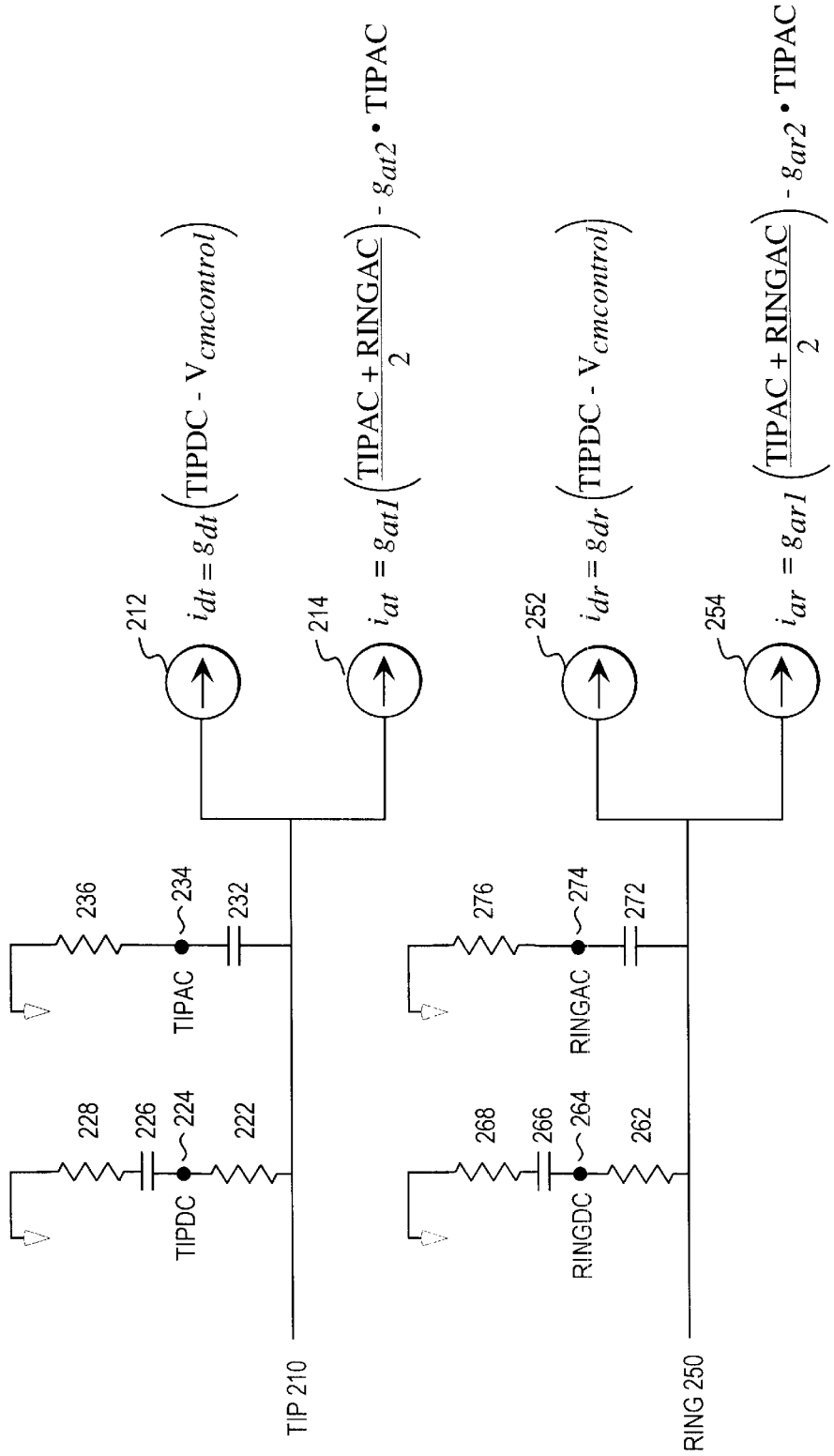
FIG. 2 illustrates a bifurcated common mode control having separate AC and DC common mode control loops.

FIG. 2 illustrates an alternative embodiment in which common mode control has been bifurcated into a DC control loop and an AC control loop. The DC control loop uses DC voltages for DC common mode voltage control. The AC control loop uses AC voltages for AC common mode voltage control.

The DC control loops for tip and ring is independent of the AC parameters. Thus the DC control loop components include a tip current source for generating a tip current, $i_{dt}$, and a ring current source for generating a ring current, $i_{dr}$, wherein each of $i_{dt}$ and $i_{dr}$ is proportional to a difference between a tip voltage and the common mode control voltage.

Resistor 222, capacitor 226, and resistor 228 form a tip DC (i.e., low pass) filter. The tip signal 210 is filtered by the tip DC filter to provide a DC tip voltage (TEPDC) at node 224. Similarly, resistor 262, capacitor 266, and resistor 268 form a ring DC filter. The ring signal 250 is filtered by the ring DC filter to provide a DC ring voltage (RINGDC) at node 264. Current source 212 controls DC common mode voltage for tip 210. Current source 252 controls the DC common mode voltage for ring 250.

Referring to FIG. 1, the error voltage $V_E$ 140

$$\left(\text{i.e., } \frac{TIP+RING}{2} - V_{cmcontrol}\right)$$

has effectively been replaced with the DC error voltage (TIPDC−$V_{cmcontrol}$) for both tip and ring. The currents contributed by current sources 212 and 252 are proportional to the DC error voltage (TIPDC−$V_{cmcontrol}$). In particular, $i_{dt}=g_{dt}$(TIPDC−$V_{cmcontrol}$). Similarly, $i_{dc}=g_{dr}$(TIPDC−$V_{cmcontrol}$). RINGDC is not needed for controlling the DC common mode voltage requirements during forward active operation (i.e., TIPDC>RINGDC). The ring DC filter, however, is provided to enable reverse active operation (i.e., RINGDC TIPDC).

In one embodiment, $g_{dt}$ and $g_{dr}$ are substantially the same (i.e., $g_{dt} \approx g_{dr}$). The $g_{dt}$ and $g_{dr}$ gains, however, do not have to be tightly controlled nor does the matching between $g_{dt}$ and $g_{dr}$ have to be tight in order to meet the DC specifications. The DC common mode control processes large voltages, so the DC common mode control loops can be designed as a large signal/low accuracy control loop. Thus in an alternative embodiment, $g_{dt}$ and $g_{dr}$ are not substantially the same (i.e., $g_{dt} \neq g_{dr}$).

The AC common mode control loop includes a tip current source for generating a tip current, $i_{at}$, and a ring current source for generating a ring current, $i_{ar}$. Each of $i_{at}$ and $i_{ar}$ is a function of an AC tip voltage and an AC ring voltage. The generated currents are determined from a difference between a first gain term times an AC longitudinal voltage and a correction term that is effectively a second gain term times the AC tip voltage.

The AC common mode control monitors the AC longitudinal voltage $$\frac{TIPAC+RINGAC}{2}$$

and controls the AC longitudinal currents $i_{at}$ and $i_{ar}$ through current sources 214 and 254, respectively. Capacitor 232 and resistor 236 form a tip AC filter for measuring AC signals from tip 210 at node 234 (TIPAC). Similarly, capacitor 272 and resistor 276 form a ring AC filter for measuring AC signals from ring 250 at node 274 (RINGAC).

In one embodiment, current source 214 contributes a current $i_{at}$ to the tip 210 portion of the subscriber loop, where $$i_{at} = g_{at1}\left(\frac{TIPAC + RINGAC}{2}\right) - g_{at2} \cdot TIPAC$$

Similarly, current source 254 contributes a current $i_{ar}$ to the ring 250 portion of the subscriber loop, where $$i_{ar} = g_{ar1}\left(\frac{TIPAC + RINGAC}{2}\right) - g_{ar2} \cdot TIPAC$$

In one embodiment, the AC gain elements $g_{at1}$ and $g_{ar1}$ are closely matched. Matching these gain elements is easier under the current topology because the AC and DC longitudinal currents are driven separately and because the AC common mode circuitry can be specifically designed for AC signal levels (<2 Volts) rather than for both AC and DC.

The second term of each AC control loop equation is provided to offset residual gains due to the tip and ring low pass filters. Resistors 228 and 268 effectively add zeroes to their corresponding low pass filters for stability. As a result, the DC common mode control loops have residual gain in the audio (AC) band. These second terms are provided to eliminate the undesirable residual effects of the DC control loops in the audio frequency band. In particular, a correction term using the $g_{at2}$ and $g_{ar2}$ gains is applied based on the TIPAC signal in order to cancel or reduce the undesirable residual effects of the DC control loop. The cancellation term improves the transmit metallic-to-longitudinal conversion. The longitudinal balance (incoming longitudinal-to-metallic balance) is not affected.

Thus subscriber loop interface circuitry having a bifurcated common mode control has been described. In particular, the subscriber loop interface circuitry includes a DC common mode control for controlling tip and ring DC common mode, characteristics, and an AC common mode control for controlling tip and ring AC common mode characteristics, wherein the AC and DC common mode controls are independent.

Although presented in the context of connecting subscriber equipment to a POTS network, other applications for the subscriber loop common mode current control techniques presented above include private exchanges and "zero loop" applications. Zero loop applications often have relatively short subscriber loops and typically occur when POTS-compatible subscriber equipment is interfaced with a non-POTS system that uses different communication media or protocols. The zero loop application need not necessarily meet typical POTS standards set forth above if the subscriber equipment is not actually connected to the public telephone network. In such cases, the subscriber loop need only meet the minimum operational requirements of the subscriber equipment POTS interface.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A subscriber loop interface circuit apparatus, comprising:
   a tip current source for generating a tip current, $i_{dt}$; and
   a ring current source for generating a ring current, $i_{dr}$, wherein each of $i_{dt}$ and $i_{dr}$ is proportional to a difference between a tip voltage (TIPDC) and a control voltage ($V_{cmcontrol}$).

2. The apparatus of claim 1 wherein $i_{dt}=g_{dt}$(TIPDC-$V_{cmcontrol}$), wherein $i_{dr}=g_{dr}$(TIPDC-$V_{cmcontrol}$), wherein $g_{dt} \neq g_{dr}$.

3. The apparatus of claim 1 wherein $i_{dt}=g_{dt}$(TIPDC-$V_{cmcontrol}$), wherein $i_{dr}=g_{dr}$(TIPDC-$V_{cmcontrol}$), wherein $g_{dt} \approx g_{dr}$.

4. The apparatus of claim 1 wherein TIPDC represents voltages having a frequency less than approximately 300 Hz.

5. The apparatus of claim 1 wherein the current sources comprise a DC common mode control loop.

6. A subscriber loop interface circuit apparatus, comprising:
   a tip current source for generating a tip current, $i_{at}$; and
   a ring current source for generating a ring current, $i_{ar}$, wherein each of $i_{at}$ and $i_{ar}$ is a function of a tip voltage (TIPAC) and a ring voltage (RINGAC), wherein the generated currents are determined from a difference between a first gain term times a longitudinal voltage and a second gain term times the tip voltage.

7. The apparatus of claim 6 wherein $$i_{at} = g_{at1}\left(\frac{TIPAC + RINGAC}{2}\right) - g_{at2} \cdot TIPAC,$$

wherein $$i_{ar} = g_{ar1}\left(\frac{TIPAC + RINGAC}{2}\right) - g_{ar2} \cdot TIPAC.$$

8. A subscriber loop interface circuit apparatus, comprising:
   a first tip current source for generating a DC tip current component, $i_{dt}$, proportional to a difference between a first tip voltage (TIPDC) and a control voltage ($V_{cmcontrol}$); and
   a second tip current source for generating an AC tip current component, $$i_{at} = g_{at1}\left(\frac{TIPAC + RINGAC}{2}\right) - g_{at2} \cdot TIPAC,$$

wherein TIPAC and RINGAC correspond to AC tip and ring voltages, respectively.

9. The apparatus of claim 8 further comprising:
   a first ring current source for generating a DC ring current component, $i_{dr}$, proportional to TIPDC-$V_{cmcontrol}$; and
   a second ring current source for generating an AC ring current component, $$i_{ar} = g_{ar1}\left(\frac{TIPAC + RINGAC}{2}\right) - g_{ar2} \cdot TIPAC.$$

10. The apparatus of claim 9 wherein $g_{at1} \approx g_{ar1}$.

11. The apparatus of claim 9 wherein TIPDC represents voltages having a frequency less than approximately 300 Hz.

12. The apparatus of claim 9 wherein TIPAC and RINGAC represent voltages having frequencies greater than approximately 300 Hz.

13. A subscriber loop interface circuit apparatus, comprising:
   a DC common mode control for controlling tip and ring DC common mode characteristics; and an AC common mode control for controlling tip and ring AC common mode characteristics, wherein the AC and DC common mode controls are substantially independent.

14. The apparatus of claim 13 wherein the DC common mode control includes a tip current source and a ring current source, wherein each of the tip and ring current sources provides a current proportional to a difference between a tip voltage and a control voltage.

15. The apparatus of claim 14 wherein the tip voltage represents voltages having a frequency less than approximately 300 Hz.

16. The apparatus of claim 13 wherein the AC common mode control includes AC tip and ring current sources, wherein the AC tip current source provides a current $$i_{at} = g_{at1}\left(\frac{TIPAC + RINGAC}{2}\right) - g_{at2} \cdot TIPAC,$$

wherein the AC ring current source provides a current $$i_{ar} = g_{ar1}\left(\frac{TIPAC + RINGAC}{2}\right) - g_{ar2} \cdot TIPAC,$$

wherein TIPAC and RINGAC are tip and ring AC voltages, respectively.

17. The apparatus of claim 15 wherein $g_{at1} \approx g_{ar1}$.

18. The apparatus of claim 13 wherein the AC common mode control includes a correction term to correct for contributions from the DC common mode control in the AC frequency range.

* * * * *